United States Patent [19]
van den Berg et al.

[11] Patent Number: 5,568,788
[45] Date of Patent: Oct. 29, 1996

[54] IMPLEMENT FOR AND A METHOD OF MILKING ANIMALS AUTOMATICALLY

[75] Inventors: Karel van den Berg, Bleskensgraaf; Rene Fransen, Vlaardingen, both of Netherlands

[73] Assignee: C. van der Lely N.V., Maasland, Netherlands

[21] Appl. No.: 66,056

[22] PCT Filed: Sep. 24, 1992

[86] PCT No.: PCT/NL92/00162

§ 371 Date: Aug. 22, 1994

§ 102(e) Date: Aug. 22, 1994

[87] PCT Pub. No.: WO93/05647

PCT Pub. Date: Apr. 1, 1993

Related U.S. Application Data

[63] Continuation-in-part of Ser. No. 916,728, Jul. 22, 1992, Pat. No. 5,275,124, which is a continuation of Ser. No. 818,764, Jan. 13, 1992, Pat. No. 5,195,456, which is a continuation-in-part of Ser. No. 485,579, Feb. 27, 1990, Pat. No. 5,080,040.

[30] Foreign Application Priority Data

Sep. 17, 1991 [NL] Netherlands .......................... 9101636

[51] Int. Cl.$^6$ ..................................................... A01J 5/011
[52] U.S. Cl. .................... 119/14.02; 119/14.08; 119/14.15
[58] Field of Search ............................ 119/14.05, 14.08, 119/14.14, 14.15, 14.47

[56] References Cited

U.S. PATENT DOCUMENTS

| | | |
|---|---|---|
| 2,512,094 | 6/1950 | Duncan . |
| 2,737,923 | 3/1956 | Duncan ................................. 119/14.09 |
| 3,036,552 | 5/1962 | Duncan et al. ...................... 119/14.18 |
| 3,115,116 | 12/1963 | Schilling et al. ................ 119/14.15 X |

(List continued on next page.)

FOREIGN PATENT DOCUMENTS

| | | |
|---|---|---|
| 0360354 | 3/1990 | European Pat. Off. . |
| 0385539 | 9/1990 | European Pat. Off. . |
| 0468588 | 1/1992 | European Pat. Off. . |
| 9001689 | 9/1991 | Netherlands . |
| 1383038 | 2/1975 | United Kingdom . |
| 2007486 | 5/1979 | United Kingdom . |
| 2218888 | 11/1989 | United Kingdom . |
| 9007268 | 7/1990 | WIPO . |

OTHER PUBLICATIONS

'Dictionaire en 2 Volumes', Larousse rue de Montparnasse 17, 75298 Paris, FR *p. 942, right column, line 22–line 23*.
Landbouwmechanisatie vol. 27, No. 5, 27 May 1976, Wageningen, NL pp. 469–471 K. Maatje et al. 'Automatische Temperatuurcontrole Bij Melkkoeien voor het Signaleren van Ziekten en Tochtigheid' *abstract*.
Transactions of the Ame. Soc. of Agricultural Engineers vol. 27, No. 4, Jul. 1984, St. Joseph, Michigan, USA pp. 1204–1210 A.K.
Datta et al. 'Real Time Acquisition and Analysis of Milk Conductivity Data' *p. 1207, right column, line 35–line 38*.
Landtechnik vol. 41, No. 5, May 1986, Lehrte, DE pp. 220–223 H. Schon 'Automatisierte Milchviehhaltung—Eine Utopie? *figure.
Landbouwmechanisatie vol. 39, No. 2, Feb. 1988, Wageningen, N p. 92 'Het B2000 Automatische Melksysteem' *col. 2, line 12–line 17*.
Landbouwmechanisatie vol. 41, No. 1, Jan. 1990, Wageningen, NL p. 17; H. Wemmenhove: 'Elektronika Doet Intrede in Duitse Melkstal'.

*Primary Examiner*—Robert P. Swiatek
*Attorney, Agent, or Firm*—Penrose Lucas Albright

[57] ABSTRACT

An implement for milking animals, especially cows, automatically, is provided with teat cups. In the line system from a teat cup down to the location where the milk lines from the teat cups join, there is provided a vacuum-sensitive sensor and/or milk-sensitive sensor and/or a temperature sensitive sensor and/or a sensor sensitive to the electrical conductivity of the milk flow. Furthermore, there is provided a computer for processing and reproducing information conveyed from these sensors.

23 Claims, 2 Drawing Sheets

U.S. PATENT DOCUMENTS

| | | | |
|---|---|---|---|
| 3,373,720 | 3/1968 | Duncan | 119/14.02 |
| 3,538,768 | 11/1970 | Duncan | 73/202 |
| 3,556,053 | 1/1971 | Padman et al. | 119/14.08 |
| 3,837,318 | 9/1974 | Duncan et al. | 119/14.08 |
| 3,878,819 | 4/1975 | Harman | 119/14.08 |
| 3,919,975 | 11/1975 | Duncan | 119/14.05 |
| 3,973,520 | 8/1976 | Flocchini | 119/14.15 X |
| 4,034,712 | 7/1977 | Duncan | 119/14.36 |
| 4,034,713 | 7/1977 | Umbaugh | 119/14.08 X |
| 4,223,635 | 9/1980 | Akerman | 119/14.02 |
| 4,344,385 | 8/1982 | Swanson et al. | 119/14.14 X |
| 4,516,530 | 5/1985 | Reisgies et al. | 119/14.14 X |
| 4,805,557 | 2/1989 | Van der Lely et al. | 119/14.08 |
| 4,805,559 | 2/1989 | Van der Lely et al. | 119/14.1 |
| 4,838,207 | 6/1989 | Bom et al. | 119/14.02 |
| 4,922,855 | 5/1990 | Tomizawa et al. | 119/14.15 |
| 4,941,433 | 7/1990 | Hanauer | 119/14.02 |
| 5,042,428 | 8/1991 | Van der Lely et al. | 119/14.08 |
| 5,069,160 | 12/1991 | Street et al. | 119/14.08 |
| 5,080,040 | 1/1992 | Van der Lely et al. | 119/14.09 |
| 5,195,455 | 3/1993 | Van der Lely et al. | 119/14.03 |
| 5,195,456 | 3/1993 | Van der Lely et al. | 119/14.09 |

IMPLEMENT FOR AND A METHOD OF MILKING ANIMALS AUTOMATICALLY

This is a continuation-in-part of application Ser. No. 916,728, filed Jul. 22, 1992, now U.S. Pat. No. 5,275,124, which is a continuation of Ser. No. 818,764, filed Jan. 13, 1992, now U.S. Pat. No. 5,195,456, which is a continuation-in-part of Ser. No. 485,579, filed Feb. 27, 1990, now U.S. Pat. No. 5,080,040.

FIELD OF THE INVENTION

The present invention relates to an implement and a method for milking animals, that is especially suitable for milking cows.

BACKGROUND OF THE INVENTION

Automatic milking takes place in a milking parlor which is provided with a milking robot typically comprising a robot arm functioning as a carrier of one or several teat cups to be applied to the teats of an animal's udder. The teats are located by means of one or several sensors, whereupon the robot arm—swung from a side of the milking parlor to underneath the animal—can be positioned so that through an upward movement of an appropriate teat cup said teat cup can be applied to a teat of the animal's udder. In order to control the process of connecting the teat cups, the milking process itself, and the physical constitution of the cows, according to the invention, the implement is characterized in that in the line system from a teat cup down to the location where the milk lines from the teat cups join there is provided one or more sensors including a vacuum-sensitive sensor, a flow-sensitive sensor, a temperature-sensitive sensor, an electrical conductivity sensor. A computer is also provided for processing and reproducing the information produced by these sensors. Such a line system may be provided for each of the quarters of the animal's udder. The sensors may be placed in only one line and consequently relate to the flow of milk from only one teat, but they may also be placed in several lines from individual teat cups and then relate to the flow of milk from several teats. When the flows of milk from the individual teats are combined in a milk claw, the sensors should be placed in one or several teat cups and in the relatively short lines from said teat cups to the milk claw; if desirable, the milk claw may comprise separate compartments to accommodate sensors for each of the quarters of the animal's udder, with the milk from these compartments joining together in a further part of this milk claw. When the milk from the individual teats is fed through separate lines to a common milk meter, the sensors in one or several teat cups and in these separate milk lines should be placed before the connection to the milk meter. When separate milk meters are used for the milk flows from the various teats the flow of milk leaving such a milk meter is fed into a central milk line and the line system in which sensors may be included is considerably longer. It should be kept in mind, however, that the location of the sensors is also determined to a large extent by the nature of the sensor. The temperature-sensitive sensor, for example, should not be placed too far downstream from a teat cup, because the milk will have cooled down too much there and the information from this sensor will thus be of little value.

According to another aspect of the invention, the implement can be provided with a vacuum-sensitive sensor for each of a plurality of teat cups, to detect the presence and/or a vacuum drawn amount therein. For a set of teat cups, the implement may be provided with a vacuum-sensitive and a flow-sensitive sensor combined with a computer to determine the dead time associated with the flow of milk. However, for each of a plurality of teat cups, the implement may also comprise a combination of a vacuum-sensitive and a flow-sensitive sensor to determine, in association with a computer, the dead time with regard to the flows of milk in the relevant teat cups.

According to a further aspect of the invention, the implement can include a temperature-sensitive sensor for one or several teat cups to determine the temperature of the relevant flow of milk, and also a computer to determine the dead time and, in conjunction with the information originating from the temperature-sensitive sensor, to produce an indication of an abnormally high temperature indicating a physiological condition in the animal. Furthermore, there may be provided for one teat cup or for each of a plurality of teat cups a combination of a temperature-sensitive sensor and a sensor to determine the electrical conductivity of a flow of milk, by means of which combination, in association with a computer, mastitis may be detected in one or several quarters of the animal's udder.

A further problem encountered when attempting to apply a teat cup is that sometimes the attempt to apply the teat cup correctly to an appropriate teat is unsuccessful.

This invention provides the capability to detect and resolve this problem as described hereinafter. As soon as a teat cup has been applied to an appropriate teat of the animal's udder, a vacuum is drawn in the teat cup, the presence of which vacuum is detected by a vacuum-sensitive sensor. However if, the vacuum-sensitive sensor does not detect the presence of a vacuum, which indicates that the teat cup has not been applied or has not been applied appropriately, one or more subsequent attempts may be made to apply the teat cup to the relevant teat, possibly preceded by a renewed determination of the teat's position in respect of the teat cup which is carried by the robot arm and is to be applied to this teat. Indication of the presence or absence of a sufficient vacuum may be provided by supplying a signal produced by the vacuum-sensitive sensor to a computer which controls the robot arm.

However, even if a sufficient vacuum has been detected by the vacuum-sensitive sensor, it may happen that the teat cup is not correct ly connected. For there is a possibility exists that the teat cup is connected to a folded-up teat pressed against the udder, so that the teat is not appropriately seated in the teat cup, whereas a sufficient vacuum may still be drawn in the teat cup. This situation, may also be detected according to this invention as follows:

After a teat cup has been applied to the appropriate teat, the start of the milk flow is detected by means of a flow-sensitive sensor, whereas, in the event that, within a predetermined time from the connection of the relevant teat, the milk flow from this teat has not started, the teat cup is disconnected and applied anew. In disconnecting and re-applying the teat cup, the teats should be distinguished from each other. When the teat cups are installed from one side with respect to the animal's udder the teat cups may be led underneath the teats concerned and be applied to them, but, when one of the teat cups to be disconnected is to be re-applied to a hindmost teat this teat cup may be impeded by the foremost teat cup that is already connected. If this situation occurs first the two foremost teat cups are disconnected, then the hindmost teat cup is connected and finally, the two foremost teat cups are re-applied. In other words, if a hindmost teat cup needs to be disconnected to be re-applied, this can be done after first disconnecting the foremost teat cups, primarily because of a lack of space; whereas if a foremost teat cup needs to be disconnected and re-applied, this can be done immediately. However, when the distance between the foremost teats is sufficiently large, such that re-applying a hindmost teat cup is not impeded, it will not be necessary to take the foremost teat cups away first. When the position of a teat has been determined, a teat cup is connected to this teat through means provided for this purpose, these means being part of the milking robot.

According to the invention these means, e.g. an electromagnet gripping the teat cups individually and being moved upwards hydraulically as described in EP-A-0 360 354, remain activated until the presence of a sufficient vacuum in the teat cup has been established by the vacuum-sensitive sensor, whereas in the event that not a sufficient vacuum has been established after a certain time lapse of e.g. a few seconds, it will again be attempted to connect the relevant teat cup by a renewed activation of said means. After a correct connection of a teat cup to an appropriate teat has been made, the vacuum can be continuously tested in order to obtain an indication signal when the teat cup falls off before the flow of milk has stopped, e.g. owing to the fact that it is kicked away by the animal.

The time lapse from the instant when a teat cup is connected to a teat to the instant when the flow of milk from this teat starts is called the dead time. This dead time can be determined by means of a computer. Accordingly, the invention also relates to a method of milking animals, especially cows, automatically, where the dead time between the instant when one of the teat cups is connected to an appropriate teat and the instant when the flow of milk from this teat starts is determined by means of a computer. In particular, the dead time between the instant when the vacuum-sensitive sensor has established a sufficient vacuum in a teat cup applied to a relevant teat and the instant when a flow-sensitive sensor has detected that the milk has begun to flow is determined by means of a computer. It will be sufficient to determine the dead time with respect to the start of the milk flow in the teat cup last applied. The idea behind this is that the dead time with respect to the last teat cup will be much the same as the dead time determined for the application of the other teat cups. It will be more correct, however, to determine. the dead time for the flow of milk from each of the teats.

In actual practice there appear to occur situations associated with the physical condition of the animals, which cause relatively large differences in dead times with regard to the start of the milk flows from the various teats. Of course, the situation where e.g. the last teat cup has not been applied correctly, or not at all, with the result that the animal cannot be milked at all, while the flows of milk in the teat cups connected first have already started, may occur at any time. Nevertheless, the animal should then leave the milking parlor. As far as the dead times which have been established relative to the flows of milk which did start, further conclusions may of course be drawn therefrom.

According to another aspect of the invention, the extent to which the dead time has exceeded a predetermined value for a particular animal can be determined by means of the computer. In particular, for each of the flows of milk from the various teats, the extent to which dead time exceeds the predetermined value is determined. This predetermined value will be different not only for various animals, but it will also change as the animals age. The farmer, however, will be basically interested only in those cases where the predetermined value is exceeded. When an animal is estrous or ill, the dead time will generally be longer than usual. If the predetermined value of the dead time has been exceeded by a certain percentage, the farmer has accordingly obtained an indication signal of the animal's heat or illness.

If a relatively long time, for example, twice the dead time determined previously for the animal, has elapsed after the vacuum in the teat cup has been established, then the computer draws the conclusion that the dead time cannot be determined, because the flow of milk has apparently not started, which may happen when an animal just milked has entered the milking parlor again. The animal should then be led away from the milking parlor.

According to the invention, a more reliable indication signal of heat or illness is obtainable from parameters including one or more of the following: the milk rate of flow, the temperature of a milk flow, the milk yield, and/or the number of times per given time period that an animal pays a visit to the milking parlor or the food quantity consumed in the milking parlor. These parameters for ill or estrous animals are different from those for healthy and non-estrous animals. One or more of the parameters may be combined with the dead time and analyzed by a computer. In doing so, to achieve a higher accuracy, especially the temperatures of each of the flows of milk from the various teats can be determined. For the determination of the temperature, use is made of temperature-sensitive sensors to be arranged in the flow of milk. When the farmer has obtained an indication that the animal is ill or threatens to fall ill, it is important to know whether mastiris or any other disease is involved. According to the invention, an indication that an animal suffers from mastiris can therefore be obtained in the computer by means of a sensor for electrical conductivity of the milk flow and, if necesary, also by means of a temperature-sensitive sensor. In particular, the electrical conductivity of the flow of milk from each of the teats can be determined. Furthermore, the computer can also determine to what extent the electrical conductivity of a flow of milk has exceeded a predetermined value for a particular animal. In order to exclude short-lived fluctuations as well as any highly gradual change in electrical conductivity of the flow of milk, this predetermined value is repeatedly re-defined by the progressive average of the relevant values established in the immediately preceding period of time, for instance, that of the latest ten measurements of electrical conductivity made. As a matter of fact, this also applies to the predetermined threshold values of the dead time.

Not only can the flow-sensitive sensor be used for establishing that a flow of milk has started, but also for establishing that a flow of milk has stopped. According to this invention, such a stop of the flow of milk is indicated to the computer, which ensures that the relevant teat cup is disconnected after the lapse of a certain period of time, (for example, two to sixty seconds), following the occurrence of this indication. The milk yield from the individual teats can thus be established. The function of the flow-sensitive sensor can be taken over by a milk meter; especially when the milk meter is capable of determining in small increments the quantity of milk produced. It then is possible to determine the milk yield, by calculating the difference between the starting and the stopping times of the flow of milk. It may also be desirable to have four milk meters to determine the milk yields from each of the individual teats.

The processing of the signals originating from the sensors by means of a computer permits that, at times randomly selectable by the farmer, the output can be displayed on the computer monitor or printed on a printer.

The data to be displayed or printed may include for example which animals and to what extent the dead time and/or the electrical conductivity of a flow of milk have exceeded their respective predetermined values. For example, the computer monitor or the printer could depict the following illustrative data a cow identified by number 25 gave evidence of an electrical conductivity which was 16% in excess of the predetermined value, a cow identified by number 100 gave evidence of an electrical conductivity which was 20% in excess of the predetermined value, a cow identified by number 150 gave evidence of an electrical conductivity which was 22% in excess of the predetermined value, etc. Similarly, it may be shown that a dead time for a cow identified by number 15 has been established which was 13% in excess of a previously determined value, that a dead time for a cow identified by number 38 has been established which was 8% in excess of a previously determined value, etc.

On the basis of the information on the electrical conductivity of a flow of milk, as given by the computer, the farmer can decide on whether or not the milk produced by a particular animal has to be drained off, for example into a waste tank. If the milk is determined to be unsatisfactory, it is fed through a computer-controlled three-way valve in a relevant milk line and drained off into e.g. a waste tank instead of being fed into a milk tank. When it is possible to establish that any quarter of an animal's udder suffers from mastiris, this permits the dairy farmer to discard only the milk from the quarter affected. This information may also be displayed on the computer monitor or on the printer. In addition to the aforementioned displayed or printed data on electrical conductivity and dead time, it can be indicated that for example, that milk from a cow identified by number 2 is being discarded, that milk from a cow identified by number 36 is being discarded, etc.

The invention will now be further explained with reference to the embodiment represented in the accompanying drawings.

DESCRIPTION OF THE PREFERRED EMBODIMENT

Figure 1:
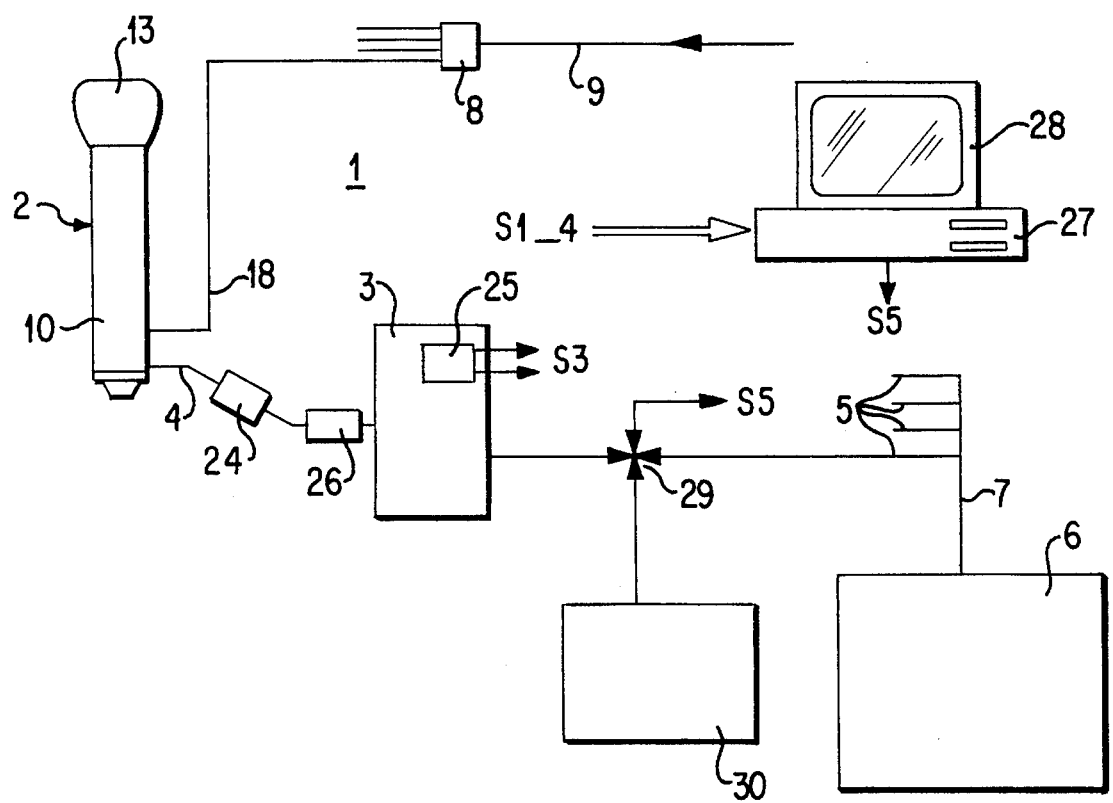
FIG. 1 is a schematic diagram of a milking plant according to the present invention.

In FIG. 1, a milking plant 1 for an implement for milking an animal automatically is depicted, with the representation of this milking plant being limited to only one teat cup 2 and one milk meter 3, for the sake of simplicity. The milk obtained from each udder quarter by means of teat cups 2 can be fed through a separate milk line 4 to a milk measuring apparatus comprising four milk meters 3. Separate discharge lines 5 of the milk meters 3 are connected to a common output line 7 running to a milk tank 6. A more elaborate basic set-up of the milking plant is depicted and described in European Patent Application EP-A-0 385 539. The milking plant further comprises, a pulsator system 8 for the four teat cups 2. Vacuum line 9 for the pulsator system 8 is connected to a vacuum pump with an equalizer tank, as is described in European Patent Application EP-A-0 385 539.

Figure 2:
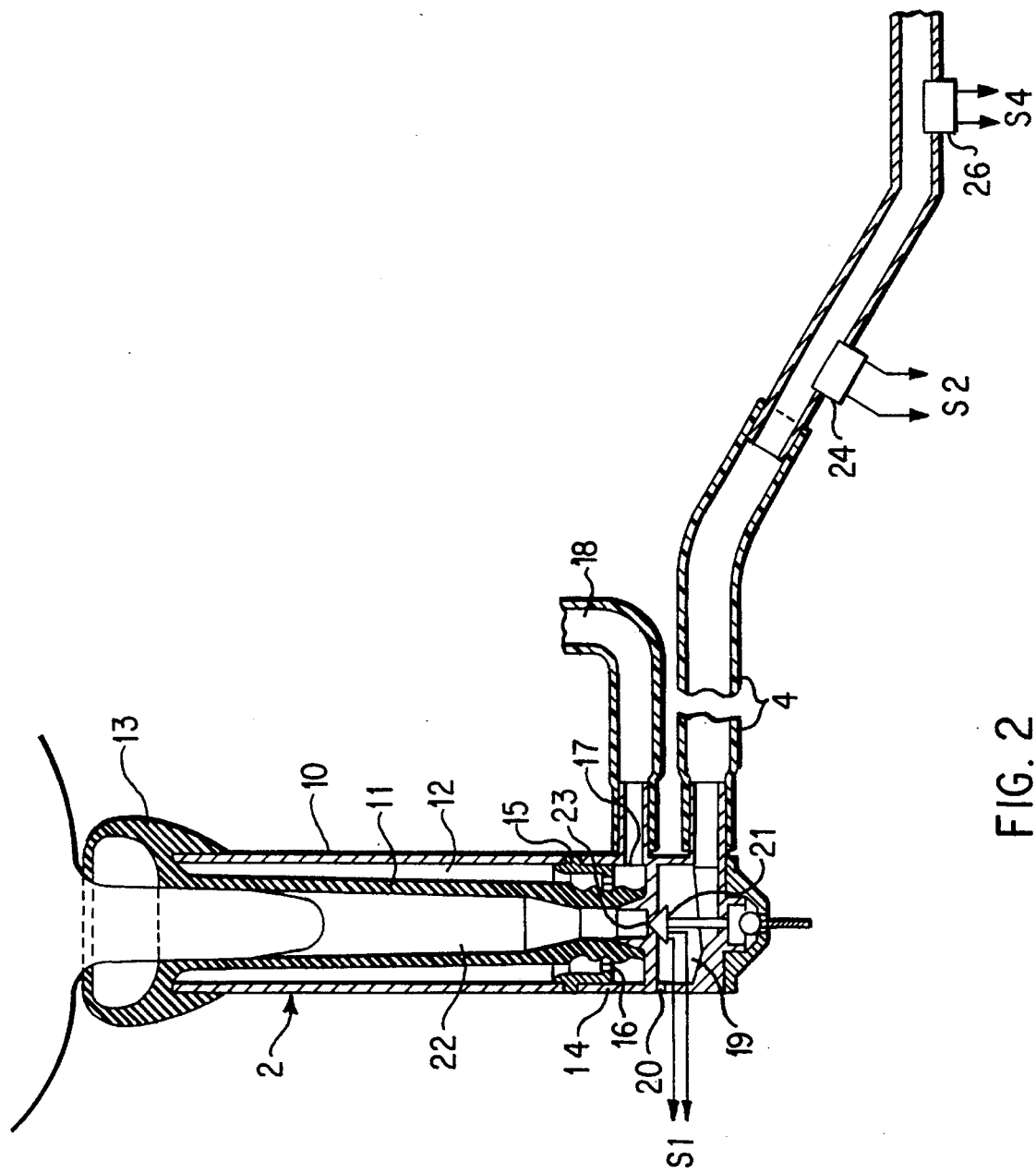
FIG. 2 is a vertical cross-section of a teat cup

In FIG. 2, a vertical section of a teat cup 2 is shown; as is usual, the teat cup is constructed from a rigid, (for example, metal) sleeve 10; from an inner wall 11 constructed of a flexible material, such as rubber, located in this sleeve, and from a rubber cap 13 which closes off the top side of gap 12 between the sleeve 10 and the inner wall 11. The bottom side of the gap between the sleeve 10 and the inner wall 11 is closed by a sealing ring 14, while between the sleeve 10 and the inner wall, above said ring, there is provided a ring 15 having an opening 16. In between the sealing ring 14 and the ring 15 there is a space to which a pulsating vacuum is applied by the pulsator system 8 through a line 18 and an opening 17, giving rise to a pulsating vacuum in the space between the sleeve 10 and the inner wall 11. The pulsating vacuum causes alternately the inner wall to enclose the teat tightly and then move outwards, resulting in the rhythmic motion about the teat as required for milking, provided that the teat cup is correctly connected to the teat. To provide a buffer for the milk to be collected and to minimise fluctuations in the vacuum under the teat, there is provided a buffer space 19 in the bottom part of the teat cup, where a relatively narrow air intake aperture 20 to facilitate the transport of milk is provided. The line 4 serving to drain the milk to the milk meter 3 is connected to this buffer space 19. Furthermore, in this buffer space 19 there is provided a stationary member 21 which partially projects into the opening between inner space 22 and the buffer space 19 to ensure that the milk gradually flows into buffer space 19 and any separation of the milk is prevented. On the top side of this member 21 a temperature-sensitive sensor 23 is provided to make temperature measurements. The milk temperature, as may thus be determined for milk already in the teat cup 2, is a good indication measure of the body temperature of the animal being milked; especially the body temperatures of ill animals. Those animals affected by mastitis will typically have higher than normal body temperatures. A flow-sensitive sensor 24 used to detect the starting and stopping of the milk flow is included in a downstream portion of the milk line 4. The operation of this flow-sensitive sensor is based on the circumstance that a flow of milk causes an electrical connection between two electrodes. The inclined position of sensor 24 prevents milk when it ceases to flow left from remaining between the electrodes, or to put it differently, it prevents from remaining a little pool of milk remains between the electrodes; for this would result in a false indication of an uninterrupted flow of milk from teat cup. The milk line 4 also includes a vacuum-sensitive sensor 26 to establish whether a sufficient vacuum exists in the milk line 4 and the teat cup 2. In milk meter 3 there is provided a sensor 25 to determine the electrical conductivity, this is the mastitis sensor. This mastiris sensor comprises a reservoir provided with electrodes to measure the electrical conductivity of the milk that is in the reservoir. With each new flow of milk, the milk that is in the reservoir is replaced. If the milk is affected by mastitis, a higher electrical conductivity is detected. With every new flow of milk a slight increase in the electrical conductivity is observed in the beginning. It is possible to establish when a flow of milk starts, too, by means of this mastiris sensor in the place of, or in addition to, the flow-sensitive sensor 24. The output signals S1, S2, S3 and S4 of the respective sensors 23, 24, 25 and 26 are provided to a computer 27, where the information from these sensors is further processed and made available for the computer monitor 28. The discharge lines 5 are further provided with a three-way valve 29 to be able to drain off the flow of milk from a quarter of the animal's udder that is affected by mastitis into a waste tank 30. When the farmer decides to send milk to the waste tank 30 as the result of information made knowable determined by the computer he issues an appropriate command to the computer to do so. The three-way valve 29 receives a signal S5 produced by the computer to redirect the flow of milk to the waste tank 30 rather than to the milk tank 6.

Although we have disclosed a preferred embodiment of our invention, it is to be understood that it is capable of other adaptations and modifications within the scope of the following claims.

Having disclosed our invention, what we claim as new and to be secured by Letters Patent of the United States is:

1. An implement for automatically milking animals, such as cows, comprising a line system which comprises a plurality of milk lines that each extend from a teat cup to a junction formed where said plurality of milk lines from said teat cups join; at least one sensor selected from the group consisting essentially of a vacuum-sensitive sensor, a flow-sensitive sensor, a temperature-sensitive sensor and an electrical conductivity sensor in said line system;

and a computer for processing and reproducing information provided thereto by said at least one sensor.

2. An implement as claimed in claim 1, wherein said flow-sensitive sensor produces a signal when the flow milk from an animal's teat received in a said teat cup stops, and means for receiving this signal capable of automatically taking such teat cup out of operation via said computer.

3. An implement as claimed in claim 1, wherein said at least one sensor comprises a vacuum-sensitive sensor and a flow-sensitive sensor which provide output signals to said computer whereby said computer determines and records the time between when said plurality of teat cups is connected to teats and when the flow of milk therefrom begins.

4. An implement as claimed in claim 1, wherein said at least one sensor comprises a vacuum-sensitive sensor and a flow-sensitive sensor which each provide output signals to said computer whereby said computer determines and records the time between when one of said teat cups is connected to a teat and the commencement of the flow of milk therefrom.

5. An implement as claimed in claim 4, wherein said computer includes means for determining the presence of an abnormal physiological condition in the animal being milked from calculated dead time.

6. An implement as claimed in claim 1, wherein said at least one sensor comprises a temperature-sensitive sensor for at least one of said teat cups for measuring the temperature of the flow of milk from the animal being milked, and said computer determines therefrom the presence of an abnormal physiological condition in the animal.

7. An implement for automatically milking animals, such as cows, the implement comprising teat cups, a milking plant and a computer located in said milking plant; said milking plant including a flow-sensitive sensor wherein a signal is produced when the flow of milk from an animal's teat stops; and means for conveying said signal to a computer that automatically puts such teat cup out of operation upon receiving said signal.

8. An implement as claimed in claim 7, wherein a vacuum-sensitive sensor for detecting a vacuum within the teat receiving portion of a teat cup is provided for each of said teat cups.

9. An implement for automatically milking animals such as cows which comprise a computer, at least one teat cup, said at least one teat cup including a combination of a temperature sensitive-sensor and an electrical conductivity sensor, said sensors being interconnected with said computer so that said computer is capable of detecting abnormal physiological conditions in a said animal while it is being milked.

10. A method of milking animals, such as cows, which comprises: applying a teat cup to the animal's teat; drawing a vacuum on the portion of said teat cup wherein said teat is received; determining the amount of said vacuum with a vacuum-sensitive sensor, and removing and reapplying said teat cup to the animal's teat if the amount of said vacuum is below a predetermined value.

11. A method of milking animals as claimed in claim 10, comprising detecting milk flow in said teat cup by a flow-sensitive sensor, and removing said teat cup from said teat if a flow of milk is not detected by said sensor within a predetermined period of time after connection of said teat cup to said teat or if said flow stops.

12. A method of automatically milking animals, such as cows, which comprises: determining the position of an animal's teat; connecting a teat cup to said teat with a connection means; detecting whether a predetermined amount of vacuum exists in the portion of said teat cup receiving said teat with a vacuum-sensitive sensor; and removing and again connecting said teat cup to its corresponding said teat when said predetermined amount of vacuum is not detected by said sensor.

13. A method of automatically milking animals as claimed in claim 12, wherein said teat cups include two foremost teat cups and two hindmost teat cups; the method further comprising: first, disconnecting said foremost teat cups when said predetermined amount of vacuum is not detected upon connection of said hindmost teat cups, then removing said hindmost teat cups, next reconnecting said rearmost teat cups, and finally reconnecting said foremost teat cups to said teats of the animals being milked.

14. A method of automatically milking animals as claimed in claim 12, wherein said teat cup includes an associated milk line, the method comprising continuously monitoring the milk flow in said associated milk line, and the vacuum in said teat cup, to determine if said teat cup is disconnected before the milk flow in said associated milk line has stopped.

15. A method of automatically milking animals as claimed in claim 12, comprising calculating and recording by means of a computer the dead time between the time said teat cup is connected to the teat of the animal being milked and the time the milk begins to flow from that teat.

16. A method of automatically milking animals, such as cows, which comprises: determining the position of an animal's teat; connecting a teat cup to said teat with a connection means; detecting whether a predetermined amount of vacuum exists in the portion of said teat cup receiving said teat with a vacuum sensitive sensor; removing and again connecting said teat cup to its corresponding said teat when said predetermined amount of vacuum is not detected by said sensor; and calculating and recording by means of a computer the dead time between the time said vacuum-sensitive sensor detects the existence of a predetermined vacuum in said teat cup which is applied to said teat and the time when the milk begins to flow from said teat.

17. A method of automatically milking animals as claimed in claim 16, comprising making a determination by said computer of the extent to which said dead time exceeds a predetermined value for each animal of a group of animals which are milked by the method.

18. A method of automatically milking animals as claimed in claim 17, wherein said computer determines and records the extent to which said dead time exceeds a predetermined value for each said flow of milk from each said teat of each particular animal of said group of animals.

19. A method for automatically milking animals as claimed in claim 16, comprising removing the animals to be milked from an automatic milking parlor after a lapse of a predetermined period of time following said dead time when no milk has flowed.

20. A method for automatically milking animals, such as cows, which comprises: conveying data from sensors which are located in teat cups to a computer; providing displays to a display device for any desired time setting forth particular animals having selected minimum dead times or electrical conductivities of their milk that exceed predetermined values and displaying the differences between said dead times or said electrical conductivities and said predetermined values.

21. A method for automatically milking animals as claimed in claim 20, comprising measuring the conductivity in the milk flow from the teat of an animal being milked and conveying said conductivity measurements to a computer; determining with said computer if said conductivity is within a predetermined range and routing said milk flow to a waste tank if said conductivity is not within a predetermined range.

22. A method for automatically milking animals as claimed in claim 20, comprising conveying the milk obtained from an animal being milked through a three-way valve controlled by said computer, routing the milk flow selectively through said three-way valve to either a storage tank or a waste tank depending on the conductivity value thereof.

23. A method for automatically milking animals as claimed in claim 20, comprising providing mastitis sensors in the milk flow stream of each teat cup associated with each quarter of an animal's udder, conveying data from each said mastitis sensor to said computer, determining from said data whether mastitis exists for each quarter of the animal's udder and automatically via signals from said computer, routing any mastitis affected milk from the affected quarter of the animal's udder to said waste tank.

* * * * *

UNITED STATES PATENT AND TRADEMARK OFFICE
CERTIFICATE OF CORRECTION

PATENT NO. : 5,568,788
DATED : October 29, 1996
INVENTOR(S) : KAREL VAN DEN BERG and RENE FRANSEN It is certified that error appears in the above-identified patent and that said Letters Patent are hereby corrected as shown below:

On the cover page under the heading "[30] Foreign Application Priority Data" change "Sep. 17, 1991" to --Sep. 27, 1991--.

Signed and Sealed this

Eighth Day of April, 1997

Attest:

BRUCE LEHMAN

Attesting Officer        Commissioner of Patents and Trademarks